Dec. 1, 1931.     C. H. LAND     1,833,906
SHOCK ABSORBER
Filed Sept. 25, 1929     2 Sheets-Sheet 1
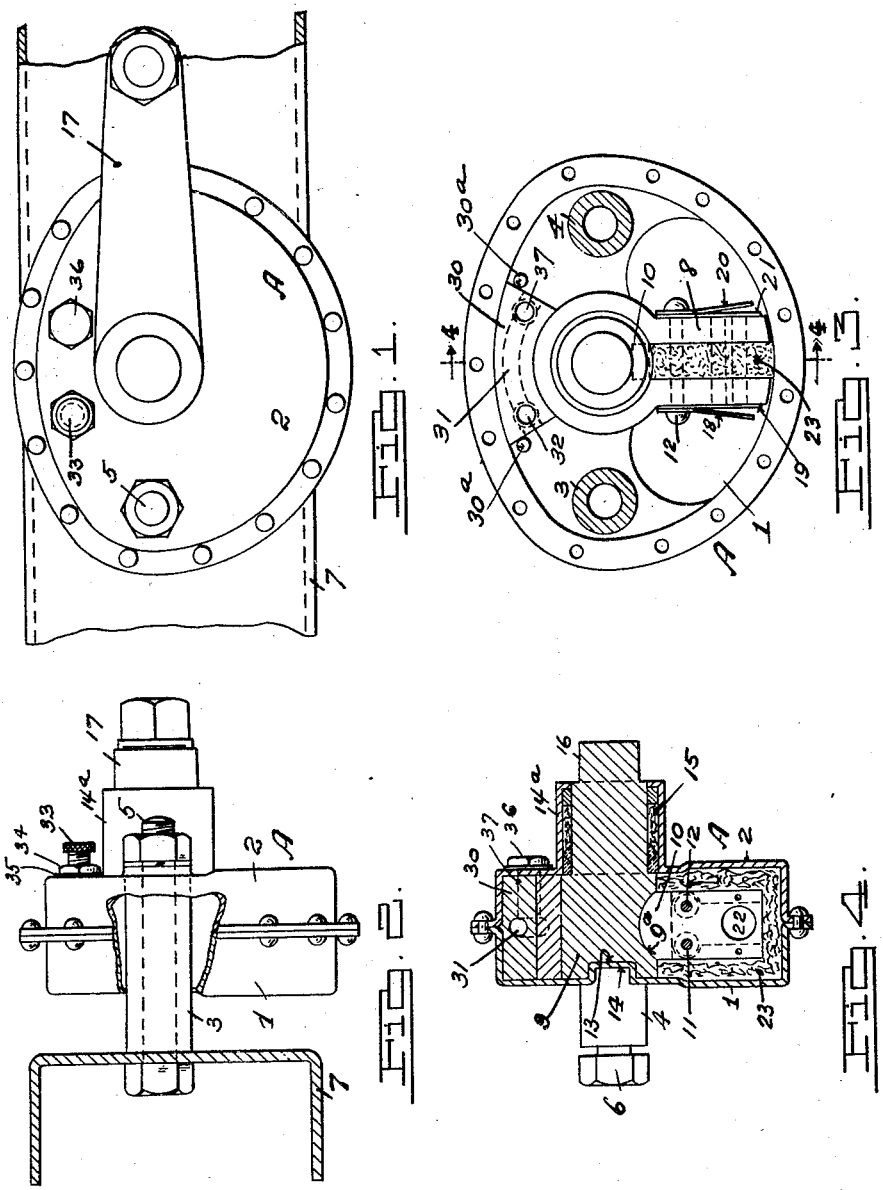

Dec. 1, 1931.  C. H. LAND  1,833,906
SHOCK ABSORBER
Filed Sept. 25, 1929  2 Sheets-Sheet 2
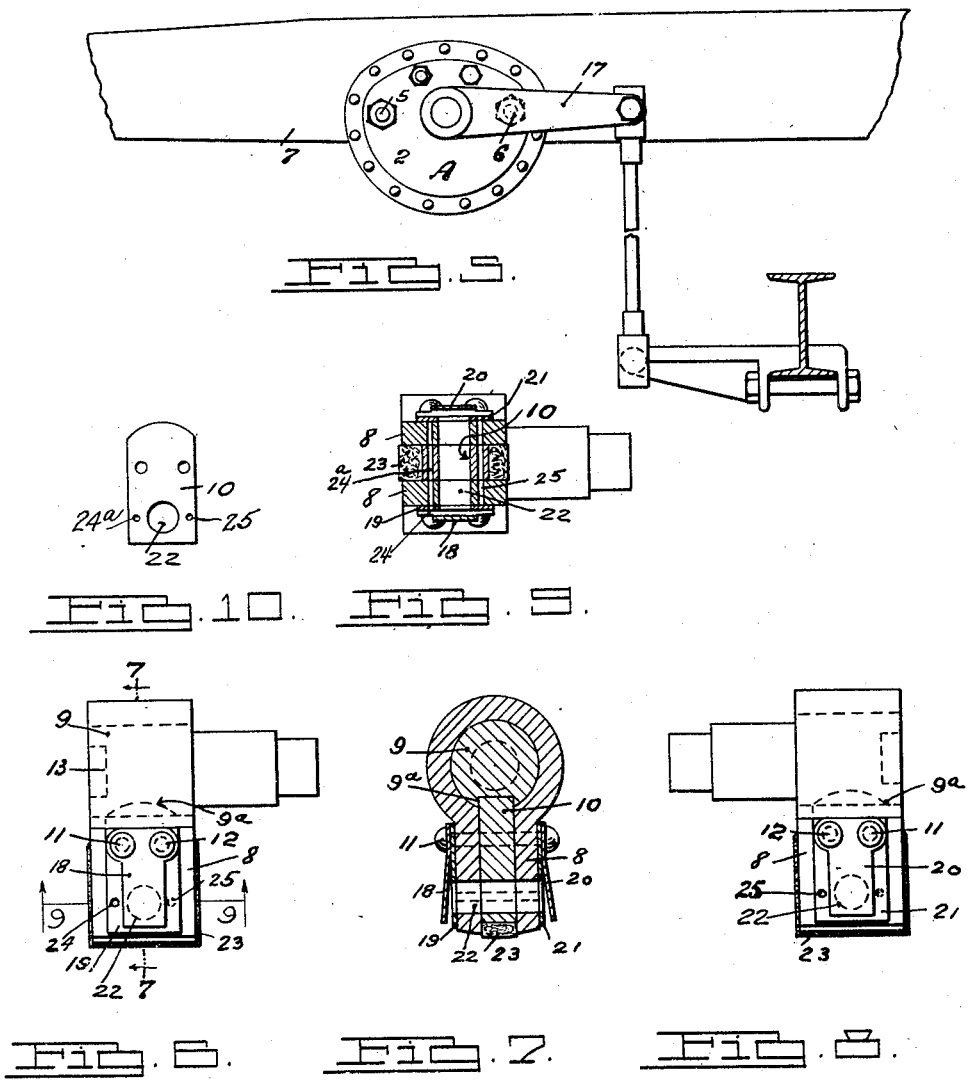
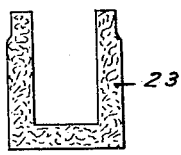
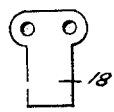
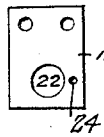
Charles H. Land
INVENTOR
BY J. E. Thomas
ATTORNEY Patented Dec. 1, 1931

1,833,906

UNITED STATES PATENT OFFICE

CHARLES H. LAND, OF GROSSE POINTE, MICHIGAN

SHOCK ABSORBER

Application filed September 25, 1929. Serial No. 394,953.

My invention relates to an improvement in shock absorbers shown in the accompanying drawings and more particularly described in the following specification.

The object of the present invention is to provide a non-precision shock absorber made from stampings thereby eliminating costly and accurate machining and also embodying substantial novelty in the combination of its parts.

The principal object of the present invention is to provide a relatively thin non-distortable casing provided with fluid controlling devices so arranged that the vehicle springs function normally under ordinary conditions but under excessive rates of deflection, the intensity of resistance to flow of the liquid is increased up to a maximum where a relief is provided to prevent hammering and to insure smooth riding qualities.

It being obvious that a relatively thin casing would be distorted by the hydrostatic pressures developed, suitable reinforcements are therefore provided, which serve also as means for attaching the device to a vehicle frame.

A further object of the invention is to provide an impeller with automatic relief valves respectively operating to alternately control the flow in either direction through the impeller,—also two valves loaded open, for automatically checking the flow of fluid in either direction.

A further object is to provide a device for controlling the flow of liquid from side to side of the casing independent of the impeller, with a novel means of forming and emplacing same.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a side elevation of the shock absorber bolted to the chassis frame.

Figure 2 is an end view with a portion of the casing broken away—showing the chassis frame in cross-section.

Figure 3 is a side elevation and sectional view, with one half of the casing removed to disclose the internal construction of the device.

Figure 4 is a vertical cross-sectional view taken on or about line 4—4 of Figure 3.

Figure 5 is a fragmentary side elevation showing the device attached to the frame of a motor vehicle and connected with the axle of the vehicle.

Figure 6 is a detail view, showing a side elevation of the oscillating impeller removed from the casing.

Figure 7 is a vertical cross-sectional view of the impeller taken on or about line 7—7 of Figure 6.

Figure 8 is a side elevation of the impeller viewed from the side opposite that shown in Figure 6.

Figure 9 is a horizontal cross-sectional view of the impeller taken on or about line 9—9 of Figure 6.

Figure 10 is a detail view of the key block removed from between the spaced walls of the impeller.

Figure 11 is a detail view of one of the "normally open" spring valves carried by the impeller.

Figure 12 is a detail view of one of the spring valves normally in contact with the face of the impeller.

Figure 13 is a detail view showing a side elevation of the packing inclosed between the walls of the impeller.

Referring now to the reference numerals placed upon the drawings:

The shock absorber A consists of a housing comprising two stamped sectors 1 and 2 riveted together and welded to prevent leaks. Extending across these casings and through their walls are round tubings 3 and 4. These tubings are welded to the outside faces of the walls of the casings 1 and 2 and form a very strong, rigid brace. Through the tubings extend bolts 5 and 6 for attachment to the frame 7 of a chassis;—this means of attachment prevents any undue or excessive strains on the housing material.

Within the casing is located an oscillating blade or impeller 8, formed by bending flat material around a hub 9. The lower extension of this piston is spaced apart by a key block 10 which projects into a key way 9ª cut in hub 9;—these parts are held together by rivets 11 and 12.

The hub 9 is bored at one end (13) to receive an inwardly directed trunnion 14 projecting from the casing 1.

The opposite end of the hub 9 is relatively smaller in diameter than the sleeve extension 14ª of the casing 2. Packing materials 15 are located between the sleeve of casing (2) and the hub extension.

A portion of the hub extends beyond the sleeve 14ª at 16, and to this is welded a lever arm 17.

Between the legs of the impeller 8 and the block 10 is fitted packing material 23, to insure tight contact with the casings when the latter are secured together.

Riveted to the impeller 8 are four flat spring valves 18, 19, 20 and 21. The spring valves 18 and 20 are relatively more elastic, and overlap the heavy spring valves 19 and 21 and are bent to normally extend outwardly from a large port hole 22, running through the key block 10, impeller arms 8, and springs 19—21.

The heavy flat spring valves 19, 21 lie normally against the flat faces of the impeller 8. Spring valve 19 has an aperture registering with the port 22 and an aperture 24 registering with a port 24ª extending through impeller 8 and also through the key block 10. It also seats over a port hole 25 on the other side of the port 22, which also extends through impeller 8, block 10 and spring 21.

Similarly spring valve 21 has an aperture registering with the port-hole 22, and a small aperture registering with the port-hole 25;—it seats over port-hole 24.

At the top of the impeller, extending from side to side of the casing and conforming to the arc of the latter and the curvature of the impeller blade surrounding the hub is a segment of a die-cast dam 30, held in place by depressions 30ª formed in the walls of the casings.

Longitudinally through the dam extends an arc-shaped port hole 31, with a transverse port 32 at one end of the dam leading to the outside of the casing 2,—at which point a shut-off pin 33 is fitted to control the port, also a nut 34 and fibre washer 35, to prevent seepage.

At the other end of dam 30 another hole 37 is tapped extending from port 31 to outside face of casing 2. This also has a plug 36 threaded into it, and is used for filling the housing with oil.

In the operation of this device when the vehicle is normally loaded, the vane or piston 8 will be approximately midway of the area formed between the casings 1 and 2. At ordinary velocities of the impeller, either to the right or left, the liquid passes through the large port 22 with very slight resistance. Upon a rapid acceleration to the right the open spring valve 20 is gradually closed throttling the fluid flow and producing a uniformly increasing resistance to the movement of the impeller;—it being obvious that the same results will obtain upon a movement of the impeller in the opposite direction with spring 18 functioning.

If unusual velocities are encountered, the hydrostatic pressures developed by the closure of these spring valves 18—20 may be exceedingly high, the heavy spring valves 19—21 thereupon serve to relieve this condition.

In a movement of the impeller to the right, assuming that an excessively rapid velocity has closed the spring valve 20 over port 22 in valve 21, the fluid flows through relief port 25 in valve 21 and against the sealed spring valve face of valve 19, lifting it sufficiently to prevent injury to the parts and also insuring a smooth action without hammering. Upon the opposite movement of the impeller, the fluid flows through port 24 in valve 19 and lifts spring valve 21.

The flow of liquid from side to side of the impeller 8 through the supplementary passage 31 of the dam is controlled as desired by the screw-pin 33. By the adjustment of the screw-pin the resistance to oscillation of the impeller may be increased or decreased as conditions may demand.

It will be noted that the construction admits of the up and down movement of the vehicle spring, which is not checked unless a sudden excessive movement is developed;—that sudden movements are automatically resisted at an uniformly increasing degree in either direction;—that excessive pressures are relieved without hammering;—and that the auxiliary liquid flow may be readily controlled.

Having thus described my invention, what I claim is:

1. In a shock absorber, a fluid pressure chamber formed of sheet metal adapted to be secured to the frame of a vehicle; an oscillating impeller in said chamber carried by a hub having an extension projecting through the wall of the chamber; a lever secured to the hub extension for connection with a vehicle spring; a pair of valves respectively mounted on opposite sides of the impeller, each having an open discharge port registering at all times with a major port through the impeller, each of said valves having also a relief port, registering with one of a pair of relief ports through the impeller and each being adapted to automatically and alternately close the other relief port through the impeller, upon alternate oscillation of the impeller; and a pair of normally open valves adapted to alternately close the major port through the impeller, operable upon the impeller oscillating at a predetermined velocity through the fluid in said chamber.

2. A device as specified in claim 1 in combination with a dam within the pressure chamber, bridging a space between the hub and the outer wall of the chamber, with a longitudinal passage running from end to end of the dam; adjustable means for controlling said passage through the dam; and a filling plug through which fluid may be admitted to the chamber.

3. A structure as specified in claim 1 in combination with a dam dividing the chamber by bridging a space between the side walls of the chamber, the hub, and the outer wall of the chamber, with a port extending longitudinally through the dam; means for controlling the passage of said port; and means for securing said dam against accidental displacement in said chamber.

4. A structure as specified in claim 1 in combination with a plurality of tubes welded to the outer walls of the pressure chamber and projecting through and beyond the wall on one side of the chamber, whereby it may bear against the vehicle frame to which it is secured; and bolts extending through said casing and tubes to attach said device to a vehicle frame.

5. In a shock absorber, a fluid pressure chamber formed of sheet metal adapted to be secured to the frame of a vehicle; an oscillating hub bored at one end to receive an inwardly directed trunnion extending into the chamber and integral with the wall of the latter, said hub having an extension at its opposite end projecting through the wall of the chamber; a lever secured to the hub extension for connection with a vehicle spring; an impeller secured to the hub having a pair of blades spaced apart; a key block lodged between the blades of the impeller, projecting at one end into a key-way formed in the hub; a pair of leaf springs, secured to the blades on opposite sides of the impeller, each having a relatively large port-hole registering with a port-hole through the impeller, also a relief port, registering with one of a pair of relief passages through which fluid may pass in opposite directions through the impeller blades and key block, the respective leaf-springs being adapted to alternately and automatically close the other relief port through the impeller blades and key block, upon alternate oscillations of the impeller; and a pair of normally open leaf springs secured to the impeller blades adapted to alternately close the relatively large port-hole through the impeller blades and key-block,—operable upon the impeller oscillating at a certain predetermined velocity through the fluid.

6. A structure as specified in claim 5 in combination with a suitable packing strip lodged between the blades of the impeller and between the marginal edge of the key-block and the wall of the pressure chamber; and bolts extending through the leaf spring, the blades of the impeller and key block to secure the parts together as a unit.

In testimony whereof, I sign this specification.

CHARLES H. LAND.